United States Patent [19]
Amdahl et al.

[11] 3,790,960
[45] Feb. 5, 1974

[54] RIGHT AND LEFT SHIFTER AND METHOD IN A DATA PROCESSING SYSTEM

[75] Inventors: Gene M. Amdahl, Saratoga; Michael R. Clements; Lyle C. Topham, both of Santa Clara, all of Calif.

[73] Assignee: Amdahl Corporation, Sunnyvale, Calif.

[22] Filed: Oct. 30, 1972

[21] Appl. No.: 302,227

[52] U.S. Cl. .............................................. 340/172.5
[51] Int. Cl. ........................ G11c 19/00, G11c 13/00
[58] Field of Search .................................. 340/172.5

[56] References Cited

UNITED STATES PATENTS

| | | | |
|---|---|---|---|
| 3,274,556 | 9/1966 | Paul et al. | 340/172.5 |
| 3,311,896 | 3/1967 | Delmege, Jr. et al. | 340/172.5 |
| 3,350,692 | 10/1967 | Cagle et al. | 340/172.5 |
| 3,370,274 | 2/1968 | Kettley et al. | 340/172.5 |
| 3,374,463 | 3/1968 | Muir | 340/172.5 |
| 3,374,468 | 3/1968 | Muir | 340/172.5 |

*Primary Examiner*—Paul J. Henon
*Assistant Examiner*—Paul R. Woods
*Attorney, Agent, or Firm*—Flehr, Hohbach, Test, Albritton & Herbert

[57] ABSTRACT

Disclosed is a bidirectional shifter and method for use in a data processing system for right and left shifting of data. A right shifter performs a right shift by translating the data to the right and performs a left shift by rotating the data, translating the data to the right and thereafter rerotating the data. Rotation and translation occur in one logic level. The number of bits translated is decreased in successive logic levels.

13 Claims, 12 Drawing Figures

RIGHT AND LEFT SHIFTER AND METHOD IN A DATA PROCESSING SYSTEM

CROSS REFERENCE TO RELATED APPLICATION

1. Condition Code Determination And Data Processing System, Ser. No. 360,392, filed May 14, 1973, invented by Amdahl et al, assigned to Amdahl Corporation.

BACKGROUND OF THE INVENTION

The present invention relates to the field of data processing systems and specifically to the field of data shifters typically found within the execution units of data processing systems.

Data processing systems employ shifters to shift data from left to right toward the low order bits or from right to left toward the high order bits. Such shifts of data are typically performed in carrying out arithmetic shifts, logical shifts and scaling as required in the execution of the programmed instructions of the data processing system. Instructions requiring shift operations are well known in the prior art and are typically included within the instruction sets of present day data processing systems.

Prior art apparatus for carrying out instructions requiring shift operations frequently are of the flow through type which generally perform shift operations within one cycle time of the processing unit or are of the cyclic type which require a plurality of cycles of the processing unit to complete the shift operation.

While cyclic shifters may be employed where longer execution times are permissible, the general desirability of higher speed and hence shorter execution time makes shifters of the flow-through type preferable because of their shorter execution times.

Prior art flow-through shifters have typically employed circuitry of a constant data width in each level of logic. The use of a constant data width requires a full complement of circuits in each logic level and such an implementation requires a higher number of circuits than where variable data widths are utilized. Some prior art flow-through shifters have performed both left and right shifts using only a unidirectional translation in the shifter. Shifts in the direction opposite to that of the translation have been carried out by rotating (reversing) the data once before translation in the single direction and once after translation thereby effectively shifting the data in the opposite direction to that of the translation. While such rotation schemes are useful in providing bidirectional shifting (left and right) using a unidirectional translation, prior art rotations have been carried out in separate logic levels from the logic levels in which the translations are performed. Since each level of logic adds additional execution time to the performance of each shift operation, the performance of rotations and translations in different logic levels is undesirable where the cumulative number of delays, such as in high speed systems, is critical.

SUMMARY OF THE INVENTION

The present invention is a flow-through shifter and method for use in a data processing system. The shifter performs bidirectional shift operations, both left and right shifting, with a shifter which carries out unidirectional translations. In accordance with one aspect of the invention, the shifter performs both translations and rotations of data within a single logic level. In accordance with another aspect of the invention the shifter performs translations with a decreasing number of bits of translation in successive logic levels.

In a specific embodiment of the present invention, a first level of logic performs left and right shifts of 0 or 32 bits. Left shifts of 32 bits are performed by a data rotation and a 32 bit right translation within the same logic level. The second level of logic performs right translations from 0 to 28 bits in 4 bit increments. Since for a left shift, the data is rotated in the first logic level prior to being transmitted to the second logic level, no rotation is required in the second logic level because a right translation of the rotated data effects a further left shift of that data. The third level of logic performs right translations of from 0 to 3 bits in 1 bit increments. Where a left shift operation is being performed, the data is rerotated in the third logic level in order to reestablish the data in the correct orientation with respect to the rest of the data processing system. In accordance with the present invention, translations of a decreasing number of bits in successive logic levels is achieved. In one embodiment the translations are in increments of 32 bits, 4 bits, and 1 bit.

In accordance with the above summary of the invention, the present invention achieves the object of reducing the number of logic levels required to do bilateral shift operations and therefore reduces the execution time by performing data translations and rotations within the same logic level and further achieves the object of obtaining a fewer number of circuits by providing a shifter wherein the number of bits of translation and therefore the data width decreases in successive logic levels as the data passes through the shifter.

Additional objects and features of the invention will appear from the following description in which the preferred embodiments of the invention have been set forth in detail in conjunction with the drawings.

DESCRIPTION OF THE PREFERRED EMBODIMENTS

Overall System

Figure 1:
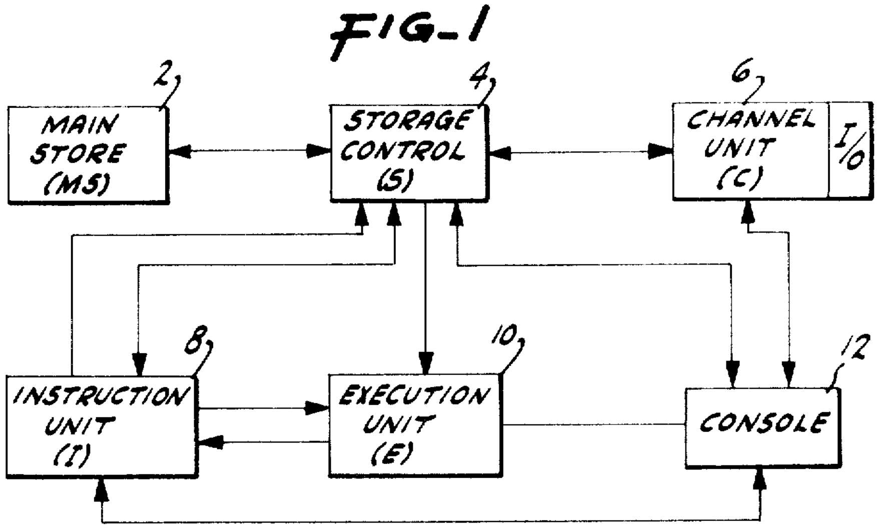
FIG. 1 depicts a block diagram of a basic environmental system suitable for employing the shifter of the present invention.

In FIG. 1, a basic environmental data processing system suitable for employing the shifter of the present invention is shown. Briefly, that system includes a main store 2, a storage control unit 4, an instruction unit 8, an execution unit 10, a channel unit 6 with associated I/O, and a console 12. In accordance with well known principles, the data processing system of FIG. 1 operates under control of a stored program of instructions. Typically, instructions as well as the data upon which the instructions operate are introduced from the I/O equipment via the channel unit 6 through the storage control unit 4 into the main store 2. From the main store 2, instructions are fetched by the instruction unit 8 through the storage control 4, and are decoded so as to control the execution within the execution unit 10. Execution unit 10 executes the instructions decoded in the instruction unit 8 and operates upon data communicated to the execution unit from the appropriate place in the system.

Execution unit 10 includes a shifter for executing those instructions of the system of FIG. 1 which require a shift operation. Specific details of the operation of the basic environmental system may be obtained by referring to the above-identified application Ser. No. 360,392, filed May 14, 1973.

Execution Unit

Figure 2:
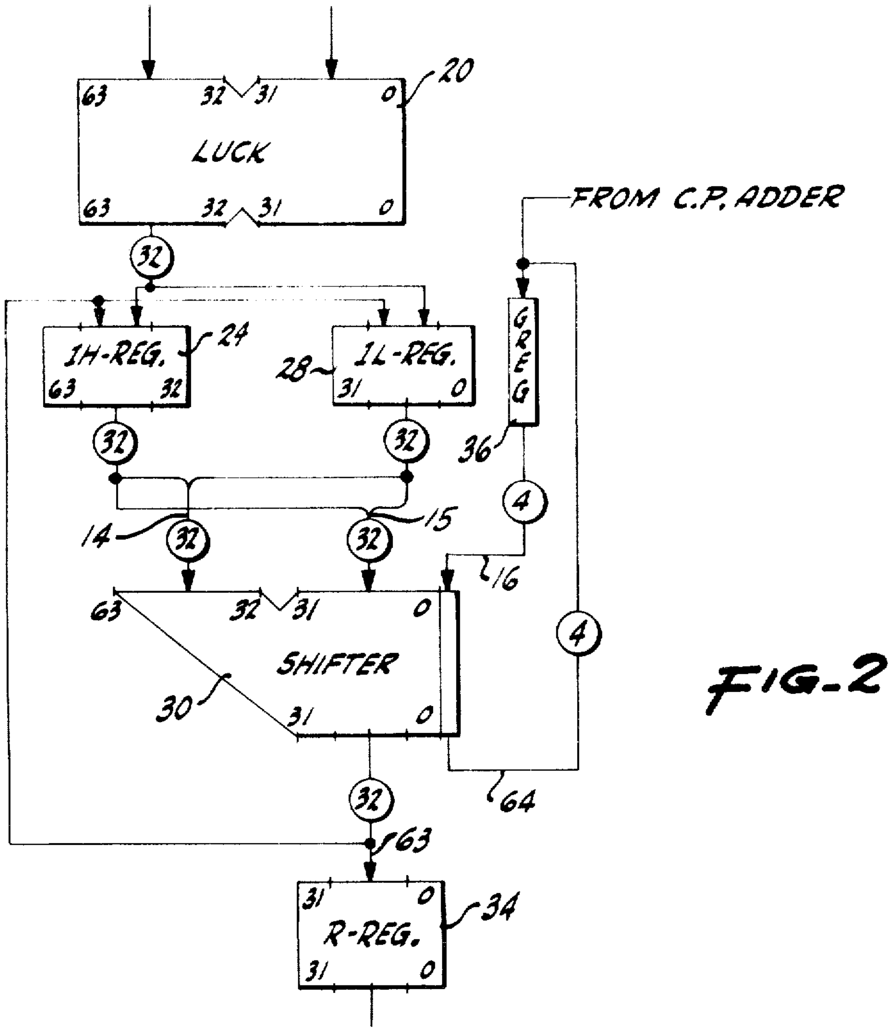
FIG. 2 depicts a schematic representation of the data paths associated with the shifter of the present invention and within the execution unit of the system of FIG. 1.

In FIG. 2, the basic data paths within the execution unit 10 which are associated with the shifter of the present invention are shown. Briefly, data to be shifted is communicated to the shifter through the LUCK 20 which is one of several functional units within the execution unit 20.

The data entering the execution unit via the LUCK 20 is gated into the 1H register 24 and into the 1L register 28. The 1H register 24 and the 1L register 28, each 32 bits wide (not including parity bits) serve as the input to the shifter 30. In the system of FIG. 1, 1 byte includes 8 bits of data exclusive of a parity bit, and 4 bytes comprises a word. For convenience, in this application, the 1L register 28 is defined as including bits 0 through 31 with the low order bits on the right running in increasing order to the left. Similarly, the 1H register 24 is for convenience defined to include bits 32 through 63 again running from right to left from low order to high order. In addition to the 64 bits of input data supplied by the 1L and 1H registers, shifter 30 also receives a 4 bit input from the G register 36. The G register 36 supplies 4 bits, G1, G2, G3 and G4, as inputs to the right-hand portion of shifter 30.

Shifter

Shifter 30 receives the 64 bits of data from the 1H and 1L registers and the 4 bits of data from the G register making a total input of 68 bits of data. Shifter 30 operates to provide 36 bits of output data which consists of the bits 0 through 31 from right to left in increasing order as well as the four guard digits G1 through G4. The guard digits are output from the shifter as an input to the G register 36. The 32 bits of output data 0 through 31 from shifter 30 are supplied directly to the R register 34 from which they are gated out of the unit 10 in FIG. 1 in accordance with the normal operation of the data processing system of FIG. 1.

Figure 3:
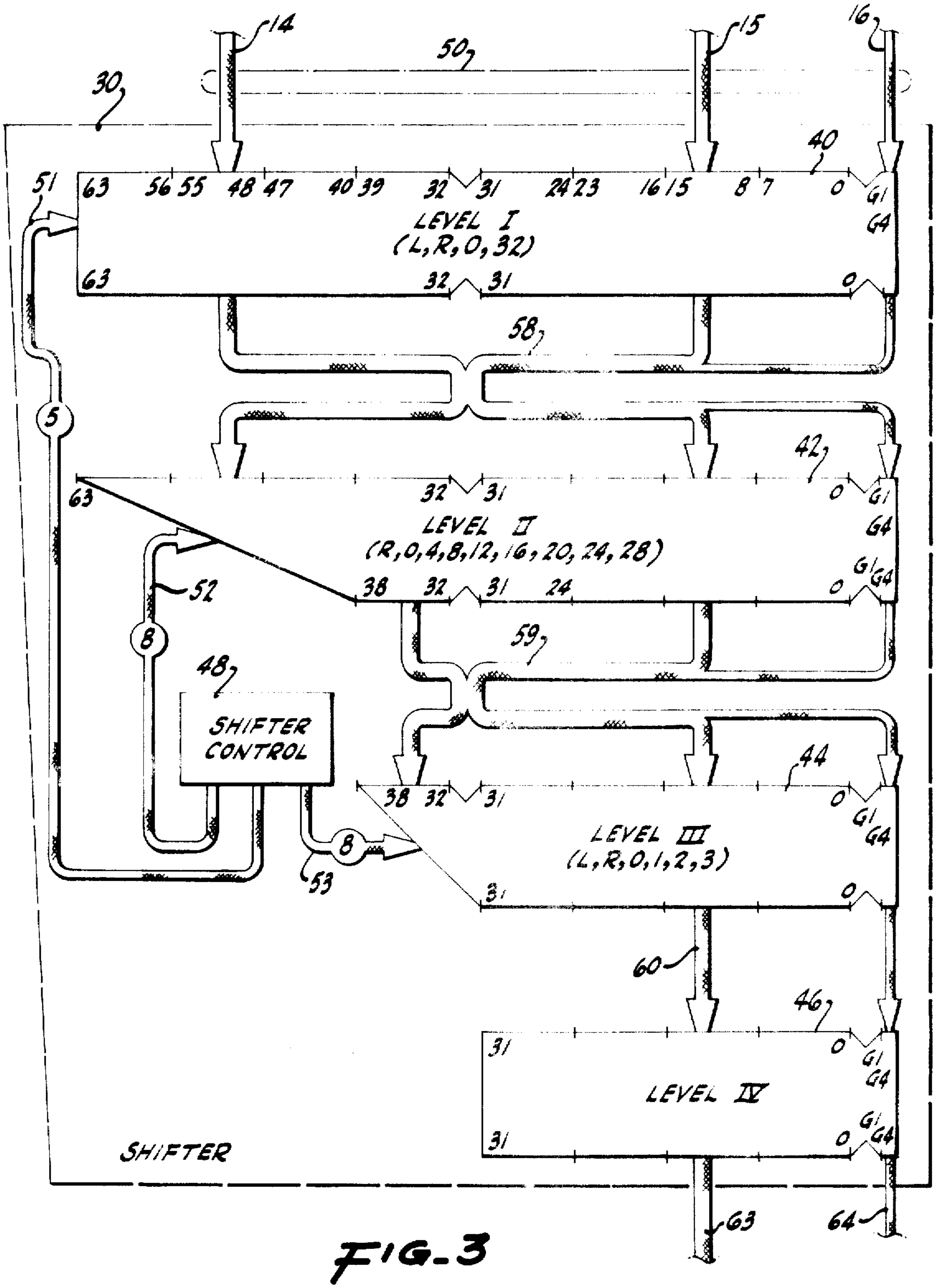
FIG. 3 depicts a block diagram representation of the component parts of the shifter of the present invention.

In FIG. 3, the LEVEL I logic 40 of the shifter 30 receives as inputs the 32 bit buses 14 and 15 each receiving the output from the 1H register 24 or the 1L register 28 and also the 4 bit bus 16 receiving the output from the G register 36. Additionally, the LEVEL I logic 40 receives a 5 bit input control bus 51 which functions to control whether or not a left or a right shift is called for and whether or not the shift is 0 bit or 32 bits. When left shifts of 32 bits or more are called for, the LEVEL I logic performs both a data rotation and a right translation.

The 68 output lines from LEVEL I indicated as buses 58 are connected as the 68 input lines to the LEVEL II logic 42. Additionally, LEVEL II receives 8 inputs from bus 52 for controlling the amount of right translation carried out by the level II logic. The LEVEL II logic performs right translations of 0, 4, 8, 12, 16, 20, 24, or 28 bits. The translated output data appears on output buses 59 and is 43 bits wide, including data bits 0 through 38 and guard bits G1 through G4. The buses 59 being 43 bit wide connect as inputs to the LEVEL III logic 44. Additionally, the LEVEL III logic receives 8 input control lines on bus 53 from shifter control 48. The LEVEL III logic functions to shift left or right 0, 1, 2, or 3 bits. The shifted output data appears on output bus 60 for bits 0 through 31 and on output bus 61 for the guard digits G1 through G4.

The outputs from the LEVEL III logic serve as inputs to the LEVEL IV logic 46. The LEVEL IV logic functions as a power level. The data output on bits 0 through 31 appears on bus 63 and the guard digit outputs, G1 through G4, appear on bus 64. As indicated in connection with FIG. 2, the bus 63 is input to the register 34 and the bus 64 is input to the G register 36.

Shifter LEVEL I Logic

Figure 4:
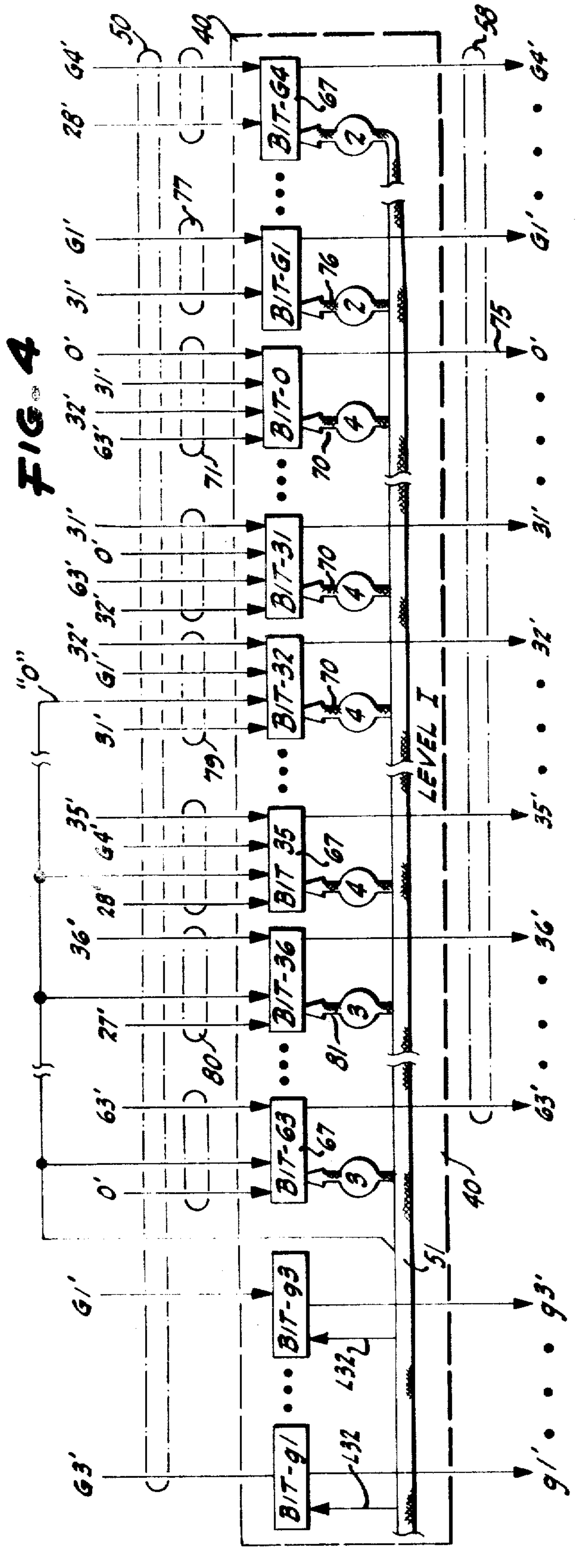
FIG. 4 depicts the LEVEL I logic component part which is identified in FIG. 3.

In FIG. 4, the LEVEL I logic schematically represented in FIG. 3 is shown in further detail. Specifically, in FIG. 4, the 68 input bit lines collectively represented by buses 50 in FIG. 3 and similarly numbered in FIG. 4 represent identically the 68 output lines from the 1H register 24, the 1L register 28 and the G register 36 of FIG. 2. More specifically the lines identified by the primed numbers at the top of FIG. 4 from 0′ through 31′ represent the outputs of the 1L register 28. The lines 32′ through 63′ similarly represent the output lines of the 1H register 24. The G1′ through G4′ lines represent the outputs from the G register 36.

Referring to FIGS. 2 and 4, the logic block bit 0 receives input bits 0′ and 31′ from the 1L register 28 and receives input bits 32′ and 63′ from the 1H register 24. In a similar manner, data inputs connect from the FIG. 2 registers to each of the logic blocks for all bit positions from bit 0 through bit 31. The right to left order of each of the input lines for each of the bits is the same. Specifically, the right hand line, labeled as RO, is energized when a right hand shift of 0 bits is desired. The second line from right to left signifies a left shift of 32 bits and is labeled as L32. The third line from left to right signifies a right shift of 32 bits and is labeled as R32. The most left hand line signifies a left shift of 0 bits and is labeled as LO.

Figure 7:
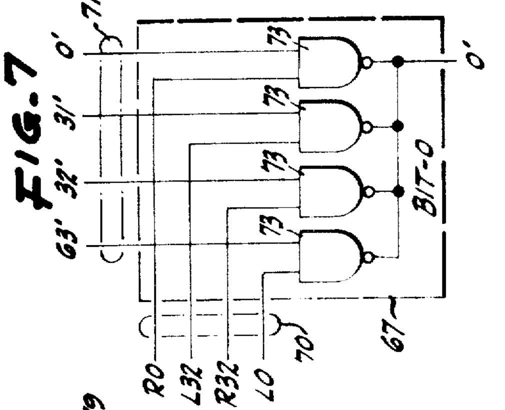

Referring to FIG. 7, the BIT–0 logic block 67 is shown in further detail. Specifically, the four input data lines 63', 32', 31' and 0', each serve as one input to a respective two input NAND gate 73. The other inputs to the NAND gates 73 are the control lines LO, R32, L32, and RO, respectively. Those four control lines are collectively represented as bus 70 in FIG. 4 which includes four of the five input lines in bus 51 from the shifter control 46 of FIG. 3. The fifth line, designated "0", has been previously discussed. In FIG. 7 the NAND gates 73 have their outputs connected in common to form a logical OR function and to produce an output on line 75.

The function of logic block 67 for bit 0 is to connect the 0' input line of line 71 to the output line 75 whenever a right shift of 0 bits is called for by energization of the RO line. When a left shift of 32 bits, indicated by energization of the L32 line, is desired, input line 31' is connected to the output line 75. When a right shift of 32 bits is desired, indicated by an energization of line R32, then input line 32' is connected to output line 75. Finally, when a left shift of 0 bits is desired, as indicated by energization of the LO line, input line 63' is connected to output line 75.

The BIT–0 logic block 67 of FIG. 7 is typical of all of the logic blocks for BIT–0 through BIT–31. In FIG. 4, the BIT–31 logic block is shown to have inputs from left to right of 32', 63', 0' and 31' corresponding to control lines LO, R32, L32 and RO. For BIT–0 through BIT–31, the RO inputs run from 0' through 31', respectively; the R32 inputs run from 32' through 63', respectively; the L32 inputs run from 31' through 0', respectively; and the LO inputs run from 63' through 32', respectively.

Figure 5:
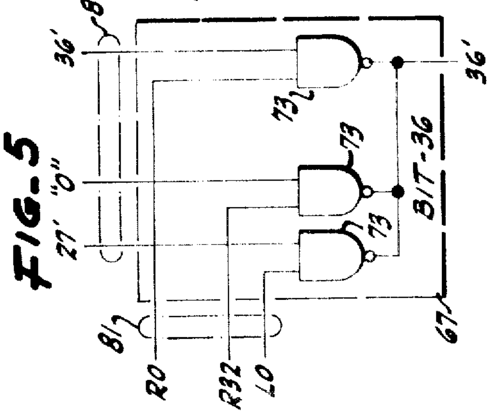

In FIG. 5, logic block 67 is shown in detail for BIT–36 which is typical for all bits for logic blocks BIT–36 through BIT–63. BIT–36 differs from BIT–0 in that no NAND gate 73 corresponding to the L32 control line is present and in that the input corresponding to the R32 line is a control line designated 0. Control line "0" is derived from bus 51 and is a logical 0 whenever the shift operation of the shifter 30 is associated with a logical instruction of the data processing system of FIG. 1. Whenever the shift being performed by shifter 30 is associated with an arithmetic instruction of the data processing system of FIG. 1, the input on line "0" is identical to bit position 63 as derived from the 1H register 24 of FIG. 2. The determination of whether an arithmetic or a logical shift is being called for by the shifter of FIG. 2 is determined in a conventional manner in shifter control 48 in response to a decoding of the instruction being executed by the data processing system.

For the logic blocks from BIT–36 through BIT–63, the inputs corresponding to RO run from 36' to 63', respectively; and the inputs corresponding to line LO run from 27' through 0', respectively.

Figure 6:
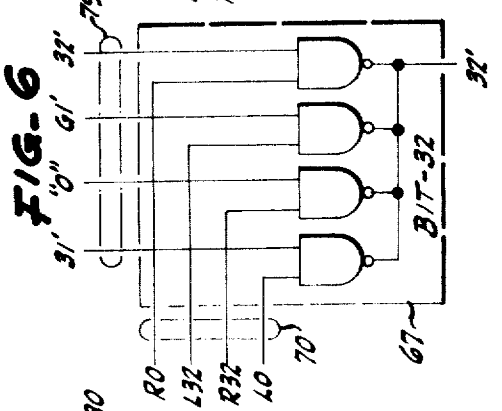

In FIG. 6, the logic block corresponding to BIT–32 is shown in detail and is representative of BIT–32 through BIT–35. Those bits differ from BIT–0 in that the gates corresponding to the control line R32 all have the "0" line input in the same manner as described in connection with BIT–36 in FIG. 5. For the logic block of BIT–32 through BIT–35, the data inputs corresponding to control line RO run from 32' through 35', respectively; the data inputs corresponding to L32 run from G1' through G4', respectively; and data inputs corresponding to control line LO run from 31' through 28', respectively.

Figure 8:
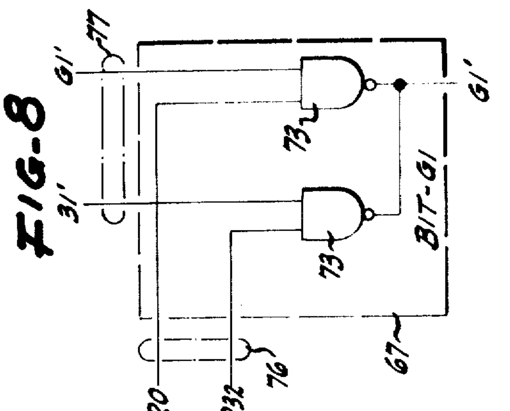
FIG. 5, FIG. 6, FIG. 7 and FIG. 8 represent typical logic blocks for representative bits within the LEVEL I logic of FIG. 4.

In FIG. 8, the logic block 67 corresponding to BIT–G1 is shown in detail and is typical for BIT–G1 through BIT–G4. Only two NAND gates 73 are employed corresponding to the control lines R0 and R32. For BIT–G4 through BIT–G1, the data inputs corresponding to the R0 line are G4' through G1', respectively; and the data inputs corresponding to the control line R32 are 28' through 31', respectively.

Shifter LEVEL II Logic

Figure 9:
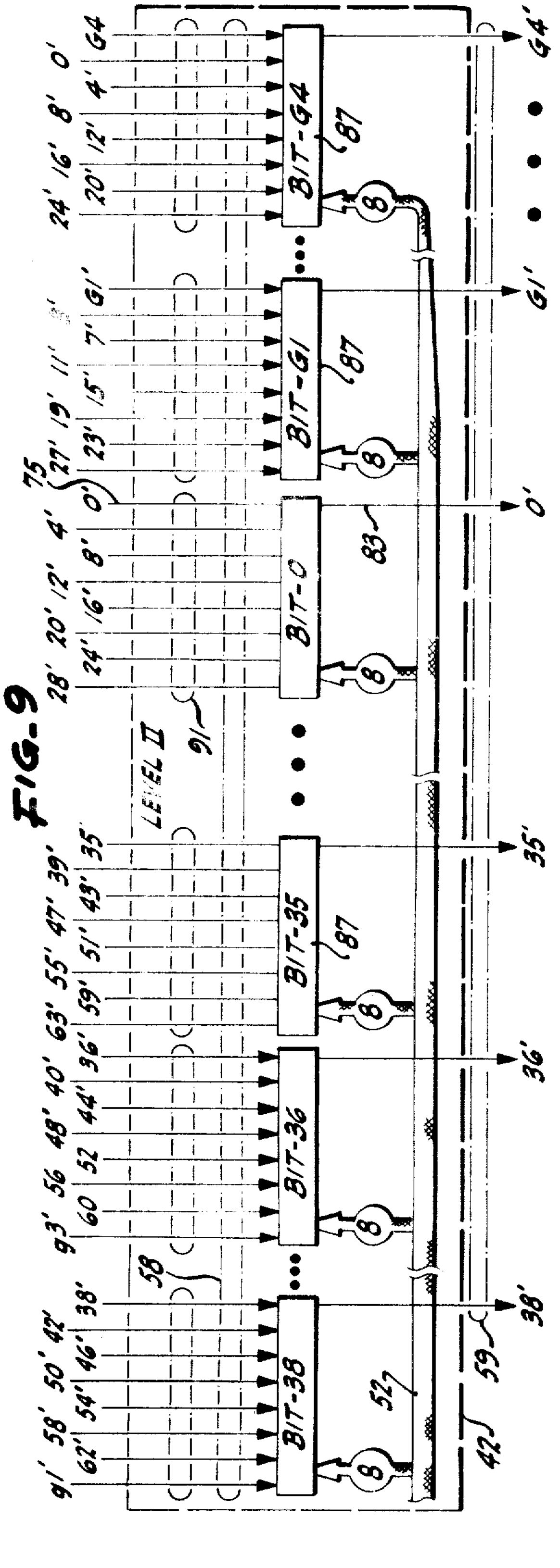
FIG. 9 depicts the LEVEL II logic component part which is identified in FIG. 3.

In FIG. 9, the 43 logic blocks 87 receive the 68 output lines 58 from LEVEL I logic 40 as previously discussed in connection with FIG. 4. The input lines at the top of FIG. 9, therefore, correspond to the output lines at the bottom of FIG. 4. Note that each logic block 87 in FIG. 9 receives 8 inputs which have an ordered significance from right to left in relation to the 8 control lines of bus 52 which are shown in more detail in FIG. 10 for BIT–0 which is typical for all the logic blocks 87.

Figure 10:
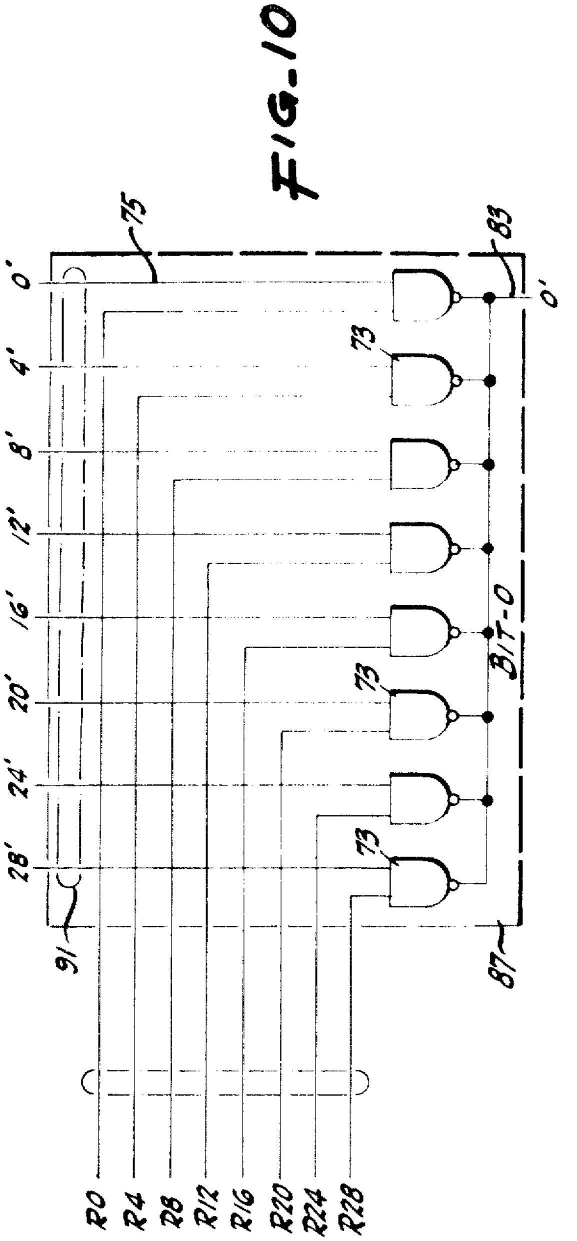
FIG. 10 depicts the logic block for a typical bit within the LEVEL II logic of FIG. 9.

In FIG. 10, logic block 87 is shown to include the 8 NAND gates 73 which have their outputs connected in common to form a logical OR to produce an output on line 83. The data inputs for BIT–0 from right to left are 0', 4', 8', 12', 16', 20', 24', and 28' which collectively are indicated as lines 91. The 8 input lines 91 correspond to the control lines R0, R4, R8, R12, R16, R20, R24, and R28 representing right translations of 0 through 28 bits in increments of 4 bits.

Shifter LEVEL III Logic

Figure 11:
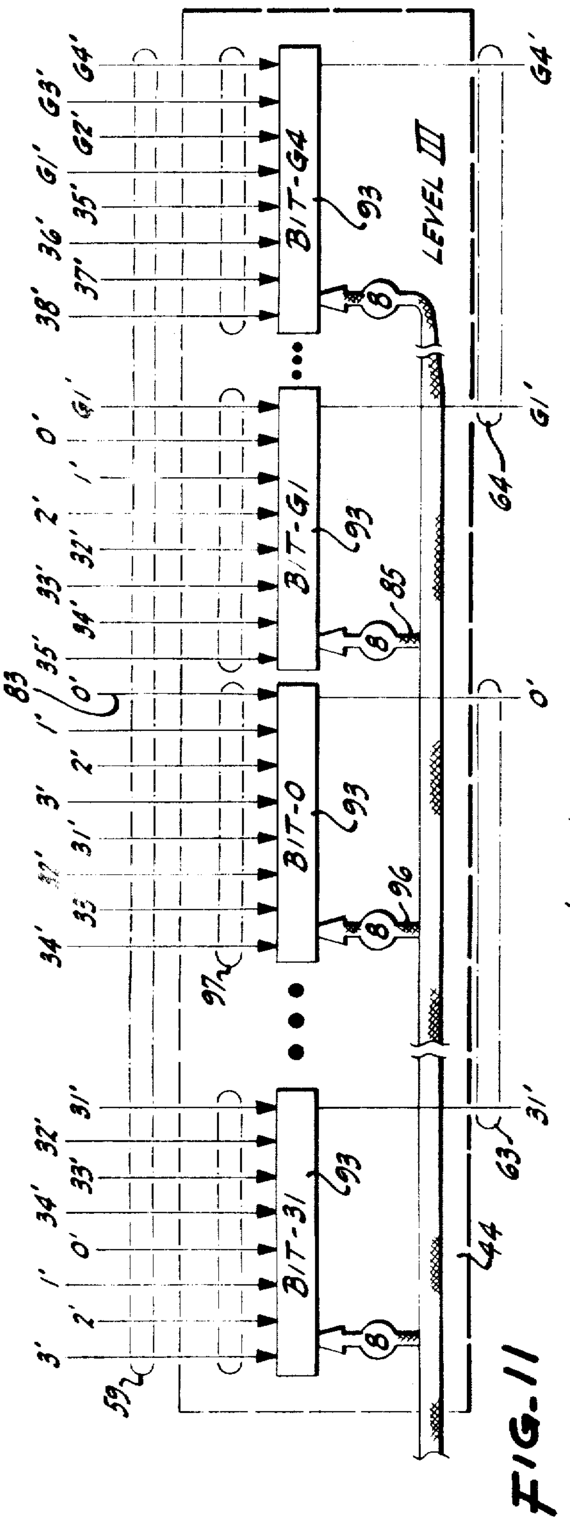
FIG. 11 depicts the LEVEL III logic component part which is identified in FIG. 3.

In FIG. 11, the 43 output lines 59 from the LEVEL II logic 44 of FIG. 9 are connected as the inputs at the top of the LEVEL III logic 44. In a manner analogous to that described in connection with FIGS. 4 and 9, the 36 logic blocks 93 receive the 43 input lines to produce 36 output lines having the data appropriately shifted as specified by the data processing system of FIG. 1. The data appears on the 32 output lines 63 and the 4 guard digit output lines 64.

Figure 12:
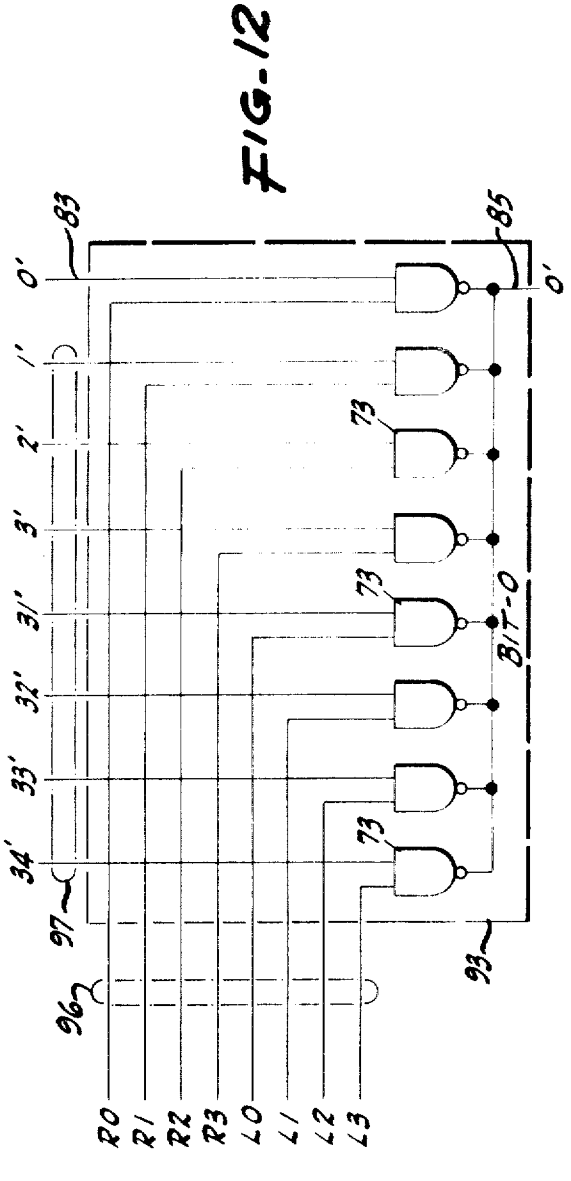
FIG. 12 depicts the logic block for a typical bit within the LEVEL III logic of FIG. 11.

In FIG. 12, BIT–0 for the LEVEL III logic is shown as typical. The 8 NAND gates 73 receive the respective input data lines 97 and have their outputs connected in common forming a logical OR function to produce the output signal on line 85. The input control lines are for right or left shifts from 0 to 3 bits and are designated as R0, R1, R2, R3, L0, L1, L2, and L3.

The energization of control lines in any of the output buses 51, 52, 53 and 54 of shifter control 48 is done in a conventional manner for a data processing system. Specifically, the right or left nature of the shift and the number of bits to be shifted is specified in the instruction decoded by the instruction unit 8 of FIG. 1. Using conventional decoding techniques, shifter control 48 energizes the appropriate output lines on all of the buses 51 through 54 to carry out the desired shift operation through each of the four levels of shifter 30.

OPERATION

The operation of the shifter of the present invention commences when the basic environmental system depicted in FIG. 1 fetches and decodes, in instruction unit 8, an instruction which requires a shift operation. The system transmits the operand to be shifted to the execution unit 10.

Referring to FIG. 2, the operand to be shifted is transferred through the LUCK unit 20 and is placed with the low order bits 0 through 31 from right to left in the 1L register 28. For a double word operand, the second word is placed in the 1H register 24 with the bits 32 through 63 placed in increasing order from right to left. With the operand consisting of bits 0 through 63 placed in the 1L and 1H registers as indicated, and with appropriate guard digits inserted in the four bits of the G register 36, the 68 bits of input data into the shifter 30 are available on buses 14, 15 and 16 at the appropriate time during the cycle of the data processing system. The input gating of the information from the registers 24, 28 and 36 is carried out with appropriate control signals in a well known manner for data processing system.

Referring to FIG. 3, at the appropriate gating time within the cycle of the data processing system, the input information is gated to the LEVEL I logic 40 which functions to translate the data right 0 or 32 bits in the case of a right shift or to rotate the data and translate it right 0 or 32 bits in the case of a left shift.

After the rotation and/or translation, if any, in the LEVEL I logic, the output data from the logic 40 is transferred via bus 58 to the LEVEL II logic 42 where an additional right translation of from 0 to 28 bits, in 4 bit increments, is carried out.

The output data from the LEVEL II logic 42 is transferred via bus 59 as an input to the LEVEL III logic 44. In the LEVEL III logic 44, a right translation of from 0 to 3 bits, in 1 bit increments, is performed, or a rotation and right translation occurs for a left shift of from 0 to 3 bits in 1 bit increments.

The total amount of shift performed by the LEVEL I, LEVEL II, LEVEL III logic is the sum of the shifts in each level. Whenever there is a rotation in LEVEL I, pursuant to a left shift operation, there is a corresponding rotation in LEVEL III to ensure that the output data on bus 60 is properly oriented within the data processing system.

The operation of the shifter of FIG. 3 is further explained with reference to two examples, specifically, a RIGHT SHIFT of 37 bits and a LEFT SHIFT of 37 bits.

For the right shift of 37 bits, LEVEL I logic 40 performs a right translation of 32 bits, LEVEL II logic 42 performs a right translation of 4 bits, and LEVEL III logic 44 performs a right translation of 1 bit.

A particular example of such a right shift of 37 bits is described in connection with the following CHART A.

CHART A—RIGHT SHIFT 37

| | | 1H Reg. | | | 1L Reg. | G Reg. |
|---|---|---|---|---|---|---|
| LEVEL I Inputs | Bits | 63–62 | 61–59 | 58–32 | 31–0 | G1–G4 |
| | Data | 1's | 0's | 1's | 1's | 1's |
| LEVEL I Outputs (R32) | Bits | 63–32 | 31–30 | 29–27 | 26–0 | G1–G4 |
| | Data | 0's | 1's | 0's | 1's | 1's |
| LEVEL II Outputs (R4) | Bits | 38–28 | 27–26 | 25–23 | 22–0 | G1–G4 |
| | Data | 0's | 1's | 0's | 1's | 1's |
| LEVELS III & IV Outputs (R1) | Bits | 31–27 | 26–25 | 24–22 | 21–0 | G1–G4 |
| | Data | 0's | 1's | 0's | 1's | 1's |

Referring to CHART A, an operand which establishes the input data to LEVEL I is held in the 1H register, the 1L register and the G register as indicated. CHART A further shows the output at each of the levels of the shifter 30 thereby indicating how the shifter operates to perform the right shift. Referring to the LEVEL I input, for example, bit position 63 and 62 of the 1H register are 1's while bits 61 through 59 are 0's. The notation is the same for each of the other levels and hence CHART A requires no further description.

As a further example of the operation of the shifter in accordance with the present invention, the following CHART B indicates how a LEFT SHIFT of 37 bits is performed on the operand indicated by the LEVEL I inputs. The 37 bit shift is accomplished by a rotation coupled with a right translation of 32 bits in LEVEL I, a right translation of 4 bits in LEVEL II, and a right translation of 1 bit and a rerotation of the data in LEVEL III.

CHART B—LEFT SHIFT 37

| | | 1H Reg. | | | 1L Reg. | | G Reg. |
|---|---|---|---|---|---|---|---|
| LEVEL I Inputs | Bits | 63–62 | 61–59 | 58–32 | 31–3 | 2–0 | G1–G4 |
| | Data | 1's | 0's | 1's | 1's | 0's | 1's |
| LEVEL I Outputs (L32) | Bits | 63–36 | 35–32 | 31–29 | 28–0 | G1–G4 | |
| | Data | 0's | 1's | 1's | 1's | 0's | |
| LEVEL II Outputs (R4) | Bits | 38–32 | 31–28 | 27–25 | 24–0 | G1–G4 | |
| | Data | 0's | 1's | 0's | 1's | 1's | |
| LEVELS III & IV Outputs (L1) | Bits | 31–8 | 7–5 | 4–1 | 0 | G1–G4 | |
| | Data | 1's | 0's | 1's | 0 | 0's | |

The right and left shift examples of charts A and B are given for the operand A comprised of the four types A1, A2, A3, A4 located in the 1H register 24 and with the operand B comprised of the four bytes B1, B2, B3, B4 located in the 1L register 28. Accordingly, each of the registers 24 and 28 contains a full word, four bytes, of data. In general, the left and right shift examples previously given relate to single word accuracy. In single word accuracy, the left and right shifts are completed with one pass through the shifter which is completed within one cycle of the data processing system.

When double-word accuracy is desired, the shifter of the present invention utilizes two passes requiring two cycles of the data processing system.

For an example of double-word processing, the single operand is stored in part in the 1H register 24 with high order bytes A1, A2, A3, A4 and in part in 1L register 28 with low order bytes B1, B2, B3, B4. For a right shift of 8 bits, the A bytes are gated via bus 14 to the left shifter input and the B bytes are gated via bus 15 to the right shifter input. The low order output of the first cycle is A4, B1, B2, B3. For the second cycle, the A1, A2, A3, A4 bytes from the 1H register are cross-gated from 1H register 24 via the input bus 15 to the right hand side of shifter 30. The output during the second cycle is the high order bits S, A1, A2, A3, where the S bits are determined by whether or not the system is performing a logical shift or an arithmetic shift as previously discussed in connection with the "0" signal and the R32 line. For double-word processing, the R32 line is selectively energizable to properly establish the desired 1 or 0 state of the S bits whether or not a right shift of 32 bits is performed.

For a left shift operation with double-word accuracy, the 1H and 1L registers store the A1, A2, A3, A4 and B1, B2, B3, B4 bytes in the manner previously described. For a left shift of 8 bits, the B bytes are cross-gated from the 1L register via bus 14 and the A bytes are cross-gated via bus 15 to the left and right shifter inputs respectively. The rotation associated with the first level arrays the bytes with the order *b*4, *b*3, *b*2, *b*1, and *a*4, *a*3, *a*2, *a*1 where the lower case letter signifies the opposite ordering of each byte. A right translation of 8 bits produces *b*4, *b*3, *b*2, and *b*1, *a*4, *a*3, *a*2. The rerotation in the first cycle carried out in level IV causes the high order bit outputs A2, A3, A4, B1.

During the second cycle of the 8 bit left shift operation, the B1, B2, B3, B4 operand is gated from the 1L register 28 via bus 15 into the right hand side of shifter 30. Through normal left shift operations, analogous to those previously described, the low order bits B2, B3, B4, S are gated out. In the case of the left shift, the low order bits S are always 0's.

It should be noted that in connection with a double-word right shift operation, the first cycle produces the low order bit outputs and the second cycle produces the high order bit outputs. By way of distinction, the left shift double-word operation produces the high order bit outputs during the first cycle and the low order bit outputs during the second cycle.

The guard digits G1 through G4 described in connection with the present invention are, of course, not essential for the operation of the invention. The guard digits are provided in order to obtain greater precision particularly when floating point arithmetic is being executed. In FIG. 4, the BIT-*g*1 through BIT-*g*3 logic blocks are each comprised of a single NAND gate having the G3' through G1' inputs, respectively, where each is controlled by the single control line L32.

While the invention has been particularly shown and described with reference to preferred embodiments thereof, it will be understood by those skilled in the art that the foregoing and other changes in form and details may be made therein without departing from the spirit and scope of the invention.

We claim:

1. A shifter for shifting input data in a data processing system comprising, first means selectable for concurrently translating and rotating the input data within one level of logic, second means selectable for concurrently rerotating and translating the data output from said first means within another level of logic, said second means translating said data a fewer number of bits than said first means when said first means translates more than 0 bits, and, third means for selecting said first and second means to control the shifting of the input data.

2. A bidirectional shifter for shifting input data in first and second directions in a data processing system comprising, a first logic level including first means selectable for translating the input data in one direction and including second means selectable for rotating the input data and for translating the data as rotated in said one direction, a second logic level including third means for translating the data from said first logic level in said one direction, a third logic level including fourth means selectable for translating the data from said second logic level in said one direction, and including fifth means selectable for rotating the data from said second logic level and for translating the data as rotated in said one direction, and, control means for selecting predetermined ones of said means selectable for shifting the input data in the first direction when said second and fifth means are selected and shifting the input data in the second direction when said second and fifth means are not selected.

3. The shifter of claim 2 wherein said third means includes means selectable to translate a fewer number of bits than said first and second means.

4. The shifter of claim 3 wherein said fourth and fifth means include means to translate a fewer number of bits than said third means.

5. The shifter of claim 2 wherein, said first and second means include means selectable to translate data 0 bits or 32 bits, said third means includes means to translate data between 0 and 28 bits in 4 bit increments, and said fourth and fifth means include means selectable to translate data between 0 and 3 bits in 1 bit increments.

6. The shifter of claim 2 wherein each of said first, second, third, fourth and fifth means comprises in one logic level a plurality of NAND gates having their outputs connected in common forming an OR function.

7. The shifter of claim 6 wherein said NAND gates consist of two-input NAND gates.

8. A shifter for use in a data processing system for shifting input data in a first direction comprising, first logic means selectable for translating the input data in the first direction a first quantity of bits, second logic means selectable for translating the data received from said first logic means in said first direction a second quantity of bits which is zero or less than said first quantity of bits, third logic means selectable for translating the data received from said second logic means in said first direction a third quantity of bits which is zero or less than said second quantity of bits, control means for selecting said logic means to control the quantity of bits shifted.

9. The shifter of claim 8 wherein said first logic means includes means selectable for translating data 0 or 32 bits, said second logic means includes means selectable for translating data 0, 4, 8, 12, 16, 20, 24, or 28 bits, and said third logic means includes means selectable for translating data 0, 1, 2, or 3 bits.

10. The shifter of claim 8 wherein, for shifts in a second direction opposite to said first direction, said first logic means further includes means selectable for rotating the input data, and wherein said third logic means includes means selectable for rotating the data received from said second logic means.

11. In a data processing system which stores data and instructions and has a plurality of functional units for executing the instructions including a bidirectional shifter for performing left and right shifts of input data by performing translations in one direction, the improved apparatus comprising, a first logic level including first means selectable for translating the input data in said one direction a first quantity of bits and including second means selectable for rotating the input data and for translating the data as rotated in said one direction said first quantity of bits, a second logic level including third means selectable for translating the data received from said first logic level in said one direction a second quantity of bits which is zero or less than said first quantity of bits, a third logic level including fourth means selectable for translating the data received from said second logic level in said one direction a third quantity of bits which is zero or less than said second quantity of bits and including fifth means selectable for rotating the data received from said second logic level and for translating the data as rotated in said one direction said third quantity of bits, and, control means for selecting predetermined ones of said means selectable for shifting the input data in the first direction when said second and fifth means are selected and for shifting the input data in the second direction when said second and fifth means are not selected.

12. The apparatus of claim 11 wherein said first logic level includes first and second word inputs and wherein said apparatus further includes first and second registers for storing input data, and means connecting said first and second registers to said first and second word inputs, respectively, whereby a single word shift of said input data is completed within one pass through said first, second and third logic levels.

13. In a data processing system which stores data and instructions and has a plurality of functional units for executing the instructions including a bidirectional flow through shifter for performing left and right shifts of input data by performing right translations, the improved apparatus comprising, a first logic level connected to receive the input data including first means having shift controls selectable for right translating the input data 0 or 32 bits and including second means having shift controls selectable for rotating the input data and for right translating the data as rotated 0 or 32 bits, a second logic level connected to receive the output from said first logic level including third means having shift controls selectable for right translating the data received from said first logic level 0, 4, 8, 12, 16, 20, 24, or 28 bits, a third logic level connected to receive the output from said second logic level including fourth means having shift controls selectable for right translating the data received from said second logic level 0, 1, 2, or 3 bits and including fifth means having shift controls selectable for rotating the data received from said second logic level and for right translating the data as rotated 0, 1, 2, or 3 bits, and control means connected to said shift controls for selecting predetermined ones of said first, second, third, fourth and fifth means to left shift the input data when said second and fifth means are selected and to right shift the input data when said second and fifth means are not selected.

* * * * *